United States Patent
Stoval et al.

(10) Patent No.: US 6,694,509 B1
(45) Date of Patent: Feb. 17, 2004

(54) AUTOMATED REGRESSION TESTING OF WORKSTATION SOFTWARE

(75) Inventors: William M. Stoval, Mt. Prospect, IL (US); David P. Edwards, Highland, UT (US)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 0 days.

(21) Appl. No.: 09/473,869

(22) Filed: Dec. 28, 1999

(51) Int. Cl.7 .................................................. G06F 9/44
(52) U.S. Cl. ...................... 717/124; 717/126; 717/128; 717/110; 717/113; 707/205; 715/514
(58) Field of Search ................................. 717/126, 127, 717/132, 136, 137, 143, 144, 114, 155, 163, 124, 128, 133, 156, 109, 113; 714/2, 38, 25; 715/203, 516, 514; 707/205

(56) References Cited

U.S. PATENT DOCUMENTS

| | | | |
|---|---|---|---|
| 5,022,028 A | | 6/1991 | Edmonds et al. |
| 5,218,605 A | | 6/1993 | Low et al. |
| 5,634,002 A | | 5/1997 | Polk et al. .............. 395/183.14 |
| 5,634,098 A | * | 5/1997 | Janniro et al. ................. 714/38 |
| 5,673,387 A | | 9/1997 | Chen et al. |
| 5,694,540 A | | 12/1997 | Humelsine et al. |
| 5,761,408 A | * | 6/1998 | Kolawa et al. ................ 714/38 |
| 5,778,169 A | | 7/1998 | Reinhardt |
| 5,784,553 A | * | 7/1998 | Kolawa et al. ................ 714/38 |
| 6,071,317 A | * | 6/2000 | Nagel ........................... 717/128 |
| 6,118,447 A | * | 9/2000 | Harel ........................... 717/131 |
| 6,259,911 B1 | * | 7/2001 | Bims et al. .................. 455/423 |
| 6,279,124 B1 | * | 8/2001 | Brouwer et al. .............. 714/38 |
| 6,349,393 B1 | * | 2/2002 | Cox ............................. 714/38 |
| 6,415,396 B1 | * | 7/2002 | Singh et al. ................... 714/38 |
| 6,513,154 B1 | * | 1/2003 | Porterfield ................... 717/101 |
| 6,523,027 B1 | * | 2/2003 | Underwood ................... 707/4 |
| 6,536,036 B1 | * | 3/2003 | Pavela ......................... 717/125 |

OTHER PUBLICATIONS

TITLE: Empirical Evaluation of the Textual Differencing Regression Testing Technique, author: Vokolos et al, IEEE, 1998.*
TITLE: The Use of Regression Methodology for the Compromise of Confidential Information in Statistical Database, author: Palley et al, ACM, 1987.*
TITLE: Regression containment through source change isolation, author: Ness et al, IEEE, Aug. 1997.*
A Visual Test Development Environment for GUI Systems, Ostrand et al., pp. 82–92.

* cited by examiner

Primary Examiner—Chameli C. Das
(74) Attorney, Agent, or Firm—Quarles & Brady LLP; Carl Horton

(57) ABSTRACT

A workstation includes a regression testing program which tests application programs developed on the workstation using stored test scripts. A test directory tree is maintained to mirror a source code directory tree, and the test directory tree is employed to select the test scripts to be used in testing any newly compiled application programs.

13 Claims, 4 Drawing Sheets

AUTOMATED REGRESSION TESTING OF WORKSTATION SOFTWARE

BACKGROUND OF THE INVENTION

The field of the invention is the testing of workstation hardware and software using regression testing techniques.

Computer programs used for testing software applications exist which can receive input data, such as key strokes, which are recognized by the software application. Upon receipt of the input data, these computer programs have the ability to store the input data (into files called test scripts), and to replay them such that the software application functions as though a user were actually typing the input data into the software application. In this way, input data can be repeatedly fed into the software application, with a user creating a test script by entering the input data only once.

By using such a computer program, a software application can be executed using a prepared test script, so as to verify that the software application performs as expected. This can be accomplished by comparing previously stored results with results which were subsequently acquired by replaying the test script through the software application. The fact that the software application performs as expected can also be used as an indication that the hardware on which the software application runs is performing as expected.

Regression testing involves providing a program with many different tests. The tests provide the program with different input. These tests exercise the specific functions, data structures, and features of the program. To perform regression testing, a computer executes the program a number of times. Each execution uses a different one of the regression tests in the script as input. The regression test results indicate which of the tests passed and which failed.

Different programmers modify different parts of the source code during application program development. Typically, the programmer compiles the program with just his/her changes. Before the programmer releases the changes, the programmer performs a number of tests on the changes. (The programmer "releases" changes by allowing others in the development team to use the changed source code.) Ideally, the testing includes running the regression tests on the newly compiled program. The regression testing shows whether the program changes cause some of the regression tests to fail.

One problem with requiring a programmer to run the regression tests when a change is made, is that regression testing may take hours or even days. Regression test script libraries can be built up over months or years. The information about what is tested by them can be lost or may not be updated. Additionally, the volume of tests makes knowing which tests test which statements very difficult. The tests may be unsorted or unclassified as to which part of the program they test. Even tests that are understood will typically test other parts of the program than the target area. Therefore, it is very difficult for a programmer to know which of the regression tests will test a particular part of the program.

During the development of a computer system many application programs are typically created and modified by one or more programmers over an extended period of time. After the product is released, maintenance activities become an important factor over the life of the product. Studies have found that more than 50% of development effort in the life cycle of a software system is spent in maintenance, and of that, a large percentage is due to testing. Except for the rare event of a major rewrite, changes to a system in the maintenance phase are usually small and are made to correct problems or incrementally enhance functionally. Therefore, techniques for selective software retesting can help to reduce development time and maintenance time.

A test script library, which is used to test a software system, typically consists of many test scripts, each of which exercises or covers some subset of the entities of the system under test. A test script must be re-run if and only if any of the program entities it covers has changed. Information relating the test scripts to the various software entities in the computer system greatly facilitate regression testing. Keeping such information up-to-date during the active development period and the extended maintenance period of the product is very difficult.

SUMMARY OF THE INVENTION

The present invention is a method and means for maintaining a library of test scripts for use in regression testing application programs. More particularly, a test directory tree is maintained which is a mirror image of a source directory tree that is used to compile the executable code for the application program. The test directory tree indicates the test scripts which are to be used in regression testing executable code compiled from corresponding entries in the same directory trees. If no mirror entry exists in the test directory tree, one is automatically created and a corresponding default test script is created and stored in the library.

DESCRIPTION OF THE PREFERRED EMBODIMENT

Figure 1:
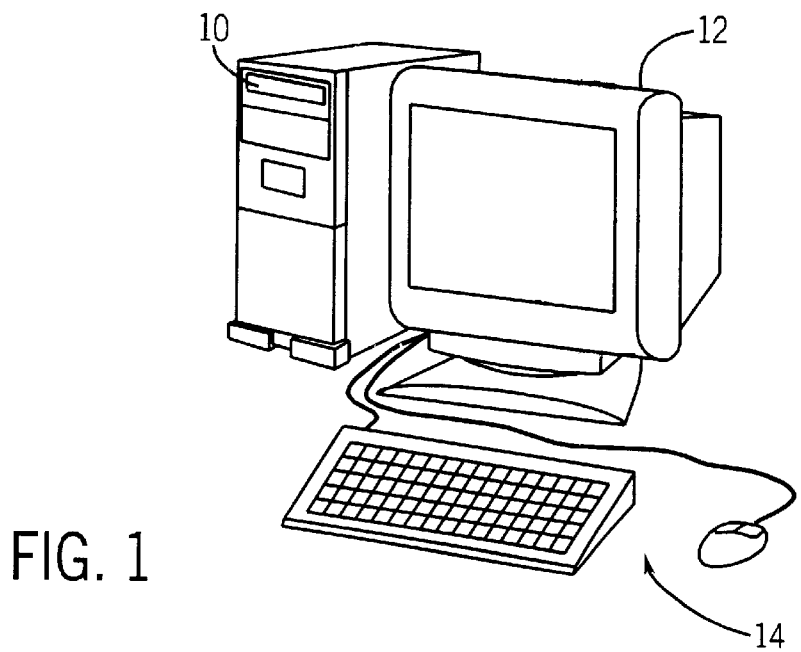
FIG. 1 is a perspective view of a workstation which has been modified to practice the preferred embodiment of the invention.

The preferred embodiment of the invention is employed in a workstation. As shown in FIG. 1 the workstation includes a mini-tower 10 which houses a processor and associated circuitry, memory, and peripheral interface circuits. One of the peripheral devices is a commercially available CRT monitor 12 which connects to a graphics circuit housed in the mini-tower 10, and another peripheral device is a keyboard and mouse 14 that connects to a PCI-based controller in the mini-tower 10. An operator may input data through the keyboard and control the position of a cursor on the monitor display 12 using the mouse. The workstation 10 may operate as a stand alone graphic display system, or it may be connected to receive digitized image data directly from a medical imaging system such as an x-ray system, x-ray CT system, MRI system, PET scanner system or nuclear medicine system. The workstation 10 typically contains application programs which perform image processing functions, such as, filtering the medical images, transforming the size and orientation of the medical images and adding textual information to the medical images.

Figure 2:
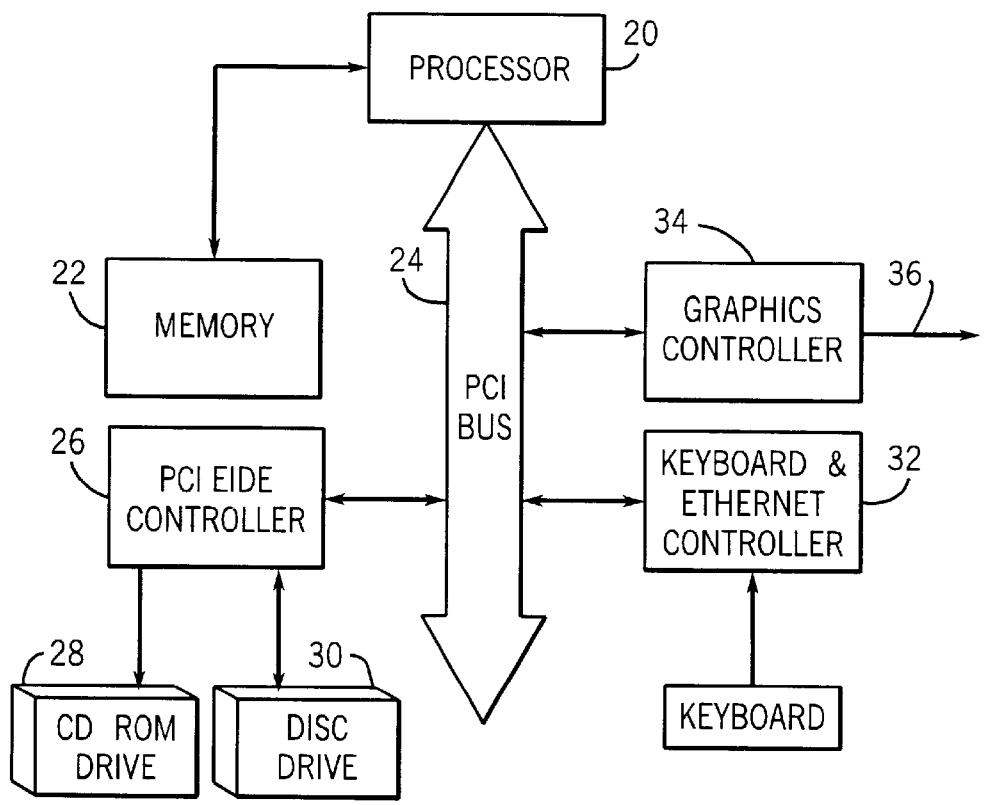
FIG. 2 is an electrical block diagram of the workstation of FIG. 1.

Referring particularly to FIG. 2, the workstation includes a processor 20 which executes instructions stored in a memory 22. The processor 20 is a commercially available device sold by Sun Microsystems, Inc. under the trademark UltraSPARC-lli. It incorporates on-chip memory and I/O control to facilitate system integration. It is a superscalar processor implementing the SPARC-V9 64-bit RISC architecture and executing the instruction set sold commercially under the trademark "VIS". It also includes an integral PCI bus driver which provides a direct interface with a 32-bit PCI bus 24. It also includes integral memory management circuitry for handling all external memory 22.

The PCI bus 24 is an industry standard bus that transfers 32-bits of data at 33 MHz between the processor 20 and a number of peripheral controller cards. These include a PCI EIDE controller 26 which provides a high-speed transfer of data to and from a CD ROM drive 28 and a disc drive 30. An Ethernet controller 32 supports data transfer with a number of peripheral devices, including input from the keyboard and mouse 14 and communication with Ethernet ports on medical imaging equipment. And finally, a graphics controller 34 couples the PCI bus 24 to the CRT monitor 12 through a standard VGA connection 36.

Figure 3:
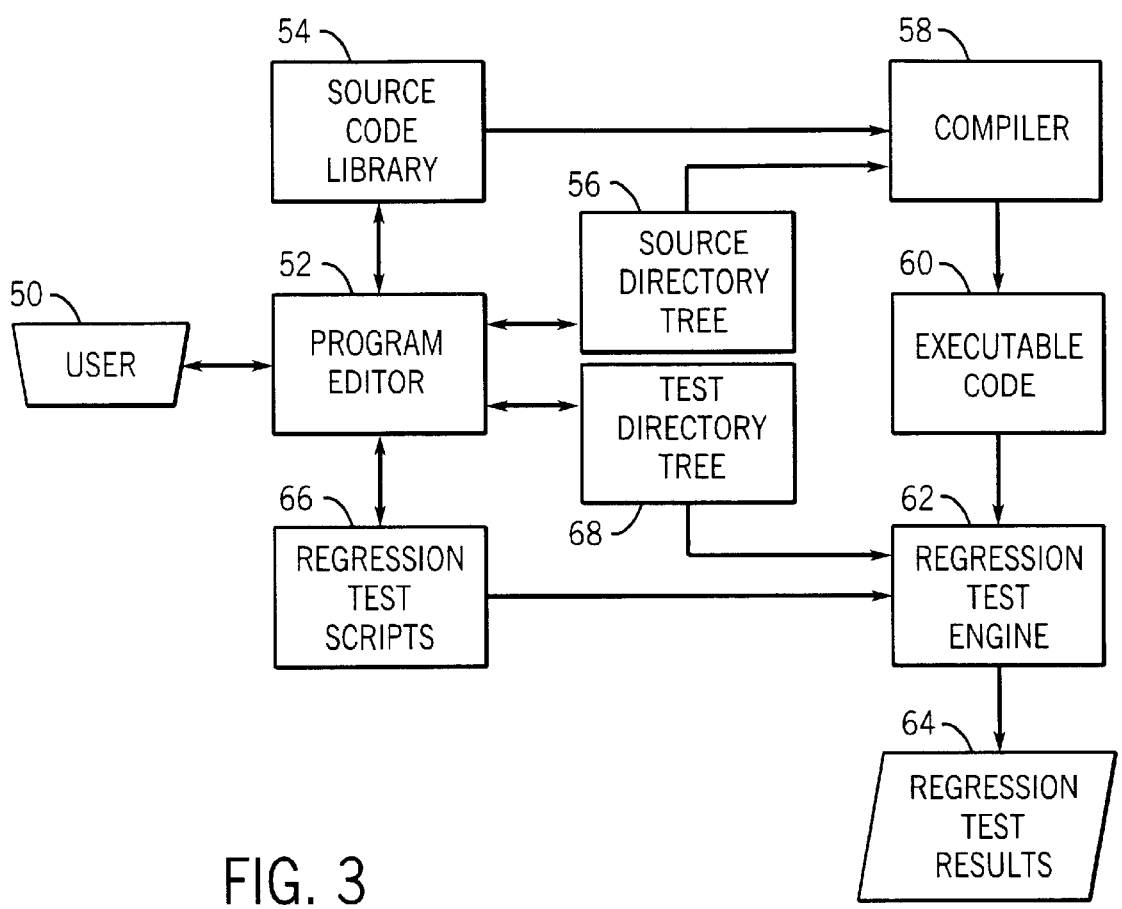
FIG. 3 is a block diagram which illustrates the software and data structures in the workstation of FIG. 1 used to create and test application programs for use on the workstation.

Referring particularly to FIG. 3, a number of programs and data structures are stored in the disc drive 30 and used to create, modify and test application programs for use on the workstation. Such an application program might be, for example, a program for retrieving a medical image and filtering the medical image to remove artifacts caused by patient motion or the like. It can be appreciated that while only a single user 50 is shown in FIG. 3, many users, each operating separate program editor software 52, may develop application programs for the workstation.

The source code for application programs developed with the editor 52 is stored in memory as part of a source code library 54. Also stored in the memory is a source code directory tree 56 which contains information about each source code program file in the library 54. The source code director tree 56 identifies which source code files in the library 54 form a particular program and indicate how those program files are linked to each other. This information is used by a compiler program 58 to retrieve the proper source code files from the library 54, compile them into executable program code, and properly link the program code together to form executable code 60.

The user 50 may direct that a set of regression tests be performed on the executable code 60 to determine if it is operating properly. This is accomplished by a program called a regression test engine 62 which may be run each time new source code is compiled. In the preferred embodiment the regression test engine 62 is run each evening and the results are produced as a report 64 that is available the next morning.

The regression test engine 62 accesses stored regression test scripts 66, and uses those test scripts 66 to verify that the executable code 60 performs as expected. As is well known in the art, the regression test scripts 66 direct the regression test engine 62 to operate the executable code 60 and provide input data to test the operation. The results produced by the executable code 60 are compared with the results expected by the regression test script 66, and a pass or fail indication is produced on the report 64. The report 64 is thus a list of the tests performed on the executable code 60 and an indication whether each test passed or failed.

The management of the regression test script library 66 and the proper selection of the regression test scripts therein for use with the regression test engine 62 is the problem addressed by the present invention. As will be described in more detail below, the solution to this problem employs a test directory tree 68, which is a data structure that is maintained during the program compilation procedure. It "mirrors" the source directory tree 56 and it indicates to the regression test engine 62 which test scripts in the library 66 are to be used to test the executable code 60.

Figure 4:
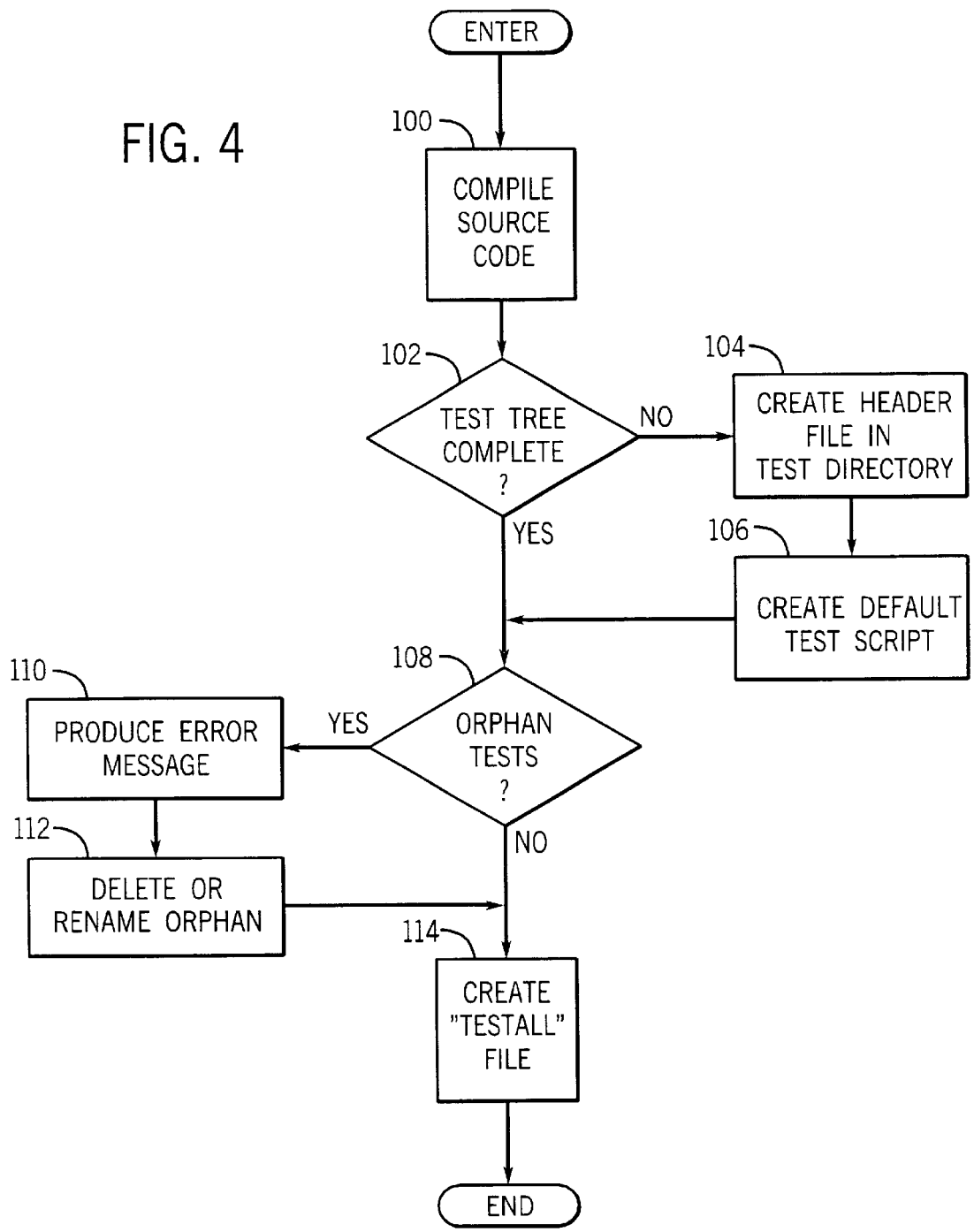
FIG. 4 is a flow chart of the steps carried out in accordance with the preferred embodiment of the invention to compile and test an application program for use on the workstation.
Figure 5:
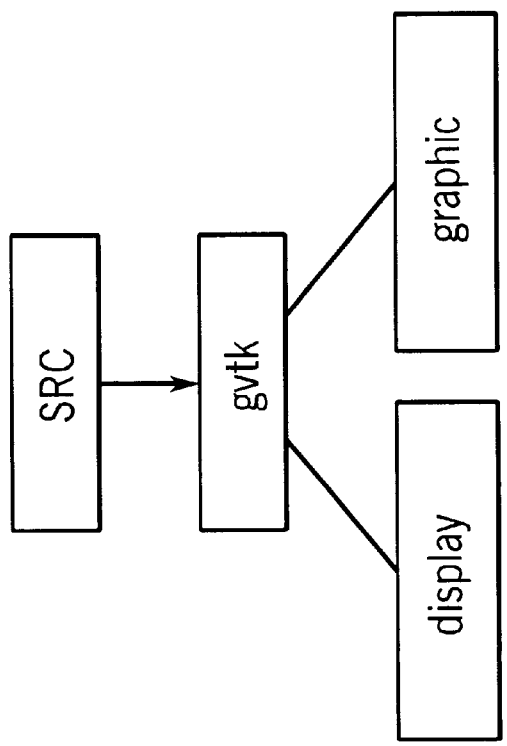
FIG. 5 shows an exemplary source code directory tree.

Referring particularly to FIG. 4, when source code in the library 54 is to be compiled a program is run as indicated at process block 100. The source code directory tree 56 is used to identify each of the source code files that must be compiled and linked. As illustrated in FIG. 5, for example, a source code file "gvtk" is compiled along with two linked source code files "display" and "graphic". As explained above, this compilation and linking process produces executable code 60.

Figure 6:
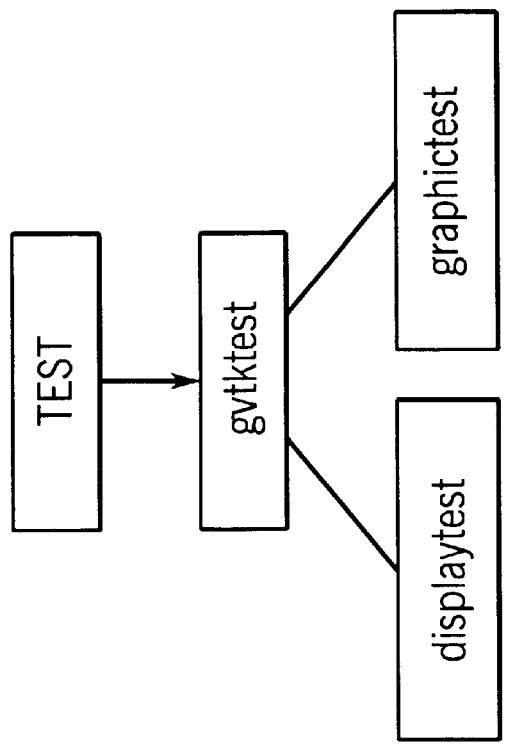
FIG. 6 shows an exemplary test directory tree.

The test directory tree 68 is then checked as indicated at decision block 102. This is accomplished by searching the test directory tree 68 for "test" header files corresponding to those in the compiled source directory tree. As illustrated in FIG. 6, for example, a complete test tree has the header files "gvtktest", "displaytest" and "graphictest". If any of the corresponding test header files are not found, a new test header file is created as indicated at process block 104. This test header file is given the same name as its corresponding source code file with the appended text string "test". A default test script for this new test header is then added as indicated at 106 to the regression test script library 66. The default script is comprised of a "runTest" portion which is a standardized script for all programs and a "reportTest" portion which indicates whether or not the test has been implemented, and if so, whether the test passed or failed. For automatically generated test files the tests are not performed and will indicate "not implemented" on the test result report 64.

To maintain the test directory tree 68, a check is made at decision block 108 to determine if any test header files therein have been orphaned. An "orphaned" file is a test file whose corresponding code file has been removed. This is done by reading each test header file in the test directory tree 68 and searching for its corresponding file in the source directory tree 56. If an orphan is found, an error message is produced as indicated at process block 110 and the user 50 may either delete the orphan test header file or rename it as indicated at process block 112. In any case, the result is a test directory tree 68 which is maintained as a mirror image of the source directory tree 56.

The final step in the compilation process is the creation of a "TESTALL" file as indicated at process block 114. This testall file is used by the regression test engine 62 to determine which regression test scripts in the library 66 are to be used in testing the newly compiled executable code 60. It is formed by listing the test header files from the test directory tree 68 which correspond to the source files from the source directory tree 56 used to compile the program. In the example depicted in FIGS. 5 and 6, the testall file is a list of the file names" gvtktest; displaytest; and graphictest.

The automatic maintenance of the test tree directory ensures that test scripts are produced for all source code files listed in the source code directory tree 56. Unused, or orphaned, test scripts are identified and the user is allowed to delete or rename them. When regression testing is performed on a periodic basis and a number of compilations are performed between tests, the testall file accumulates the test scripts that are to be performed for all the compilations. Duplicate entries in the testall file are deleted to avoid running test scripts more than once.

The invention enables an automatic test system that can be run periodically during software development. The system can operate automatically from start to finish, determining which test scripts are to be run, running the test scripts, and generating a report which indicates whether tests failed or passed.

What is claimed is:

1. In a workstation used to develop application programs, the system comprising:
   a program editor for enabling a user to create an application program;
   a source code library for storing the application program;
   a source directory tree for storing names of files which store the source code that collectively form the application program;
   a test tree directory which stores the names of test files that correspond to the source code files named in the source directory tree;
   a regression test script library for storing test scripts corresponding to the test files named in the test tree directory;
   a regression testing program responsive to test scripts selected using the test directory tree to perform regression testing on executable code produced from source code selected using the source directory tree; and
   means for automatically checking file names in the source directory tree and test file names in the test directory tree to determine if there is a test file named in the test directory tree corresponding to each file named in the source directory tree.

2. In a workstation used to develop application programs, the system comprising:
   a program editor for enabling a user to create an application program;
   a source code library for storing the application program;
   a source directory tree for storing names of files which store the source code that collectively form the application program;
   a test tree directory which stores the names of test files that correspond to the source code files named in the source directory tree;
   a regression test script library for storing test scripts corresponding to the test files named in the test tree directory;
   a regression testing program responsive to test scripts selected using the test directory tree to perform regression testing on executable code produced from source code selected using the source directory tree;
   means for creating a new regression test script for storage in the regression test script library for each file in the source directory tree which does not have a corresponding test file named in the test directory tree; and
   means for creating a new test file name in the test tree directory which corresponds to the new regression test script.

3. The workstation as recited in claim 2 in which the new regression test script is a default test script.

4. The workstation as recited in claim 2 in which the new test file name includes a text string which is the same as a text string in the corresponding file name in the source directory tree.

5. In a workstation used to develop application programs, the system comprising:
   a program editor for enabling a user to create an application program;
   a source code library for storing the application program;
   a source directory tree for storing names of files which store the source code that collectively form the application program;
   a test tree directory which stores the names of test files that correspond to the source code files named in the source directory tree;
   a regression test script library for storing test scripts corresponding to the test files named in the test tree directory;
   a regression testing program responsive to test scripts selected using the test directory tree to perform regression testing on executable code produced from source code selected using the source directory tree; and
   means for checking test file names in the test directory tree to identify orphan test files which do not have corresponding file names in the source directory tree.

6. The workstation as recited in claim 5 which further includes means for indicating to a user that an orphan test file has been found in the test directory tree.

7. The workstation as recited in claim 6 which further includes means for deleting orphan test files from the test directory tree and the corresponding test scripts from the regression test script library.

8. The workstation as recited in claim 6 which further includes means for changing the name of orphaned test files in the test tree directory.

9. A method for producing and testing programs on a programmable system, the steps comprising:
   a) creating source code programs using an editor;
   b) storing the source code programs in a source code library;
   c) storing source code file names in a source directory tree which correspond with source code programs in the source code library;
   d) producing a test tree directory which mirrors the source directory tree and includes test file names which correspond with the source code file names;
   e) producing a regression test script library for storing test scripts corresponding to the test file names in the test tree directory;
   f) testing a program produced from source code programs corresponding to selected source code file names in the source code directory tree using test scripts from the test script library corresponding to the test files that have test file names corresponding with the selected source code file names;
   g) searching for orphan test file names in the test tree directory which do not have corresponding source code file names in the source directory tree; and
   h) visually indicating the presence of an orphan test file.

10. The method as recited in claim 9 which includes:
    inputting directions from a user indicating that the orphan test file is to either be deleted or changed in name.

11. The method of claim 9, further comprising automatically updating the test tree directory whenever a change to the source directory tree is made.

12. A method for producing and testing programs on a programmable system, the steps comprising:
  a) creating source code programs using an editor;
  b) storing the source code programs in a source code library;
  c) storing source code file names in a source directory tree which correspond with source code programs in the source code library;
  d) producing a test tree directory which mirrors the source directory tree and includes test file names which correspond with the source code file names;
  e) producing a regression test script library for storing test scripts corresponding to the test file names in the test tree directory; and
  f) testing a program produced from source code programs corresponding to selected source code file names in the source code directory tree using test scripts from the test script library corresponding to the test files that have test file names corresponding with the selected source code file names; and
  g) updating the test tree directory, wherein the updating of the test tree directory includes (i) creating a new regression test script for storage in the regression test script library for each file in the source directory tree which does not have a corresponding test file named in the test directory tree, and (ii) creating a new test file name in the test tree directory which corresponds to the new regression test script.

13. The method of claim 12, further comprising generating a report as to whether the program passed the tests.

* * * * *